United States Patent [19]
Lazzari

[11] 3,947,889
[45] Mar. 30, 1976

[54] ELECTROMAGNETIC TRANSDUCERS

[75] Inventor: Jean-Pierre Lazzari, Montfort l'Amaury, France

[73] Assignee: Compagnie Internationale pour l'Informatique, Louveciennes, France

[22] Filed: Nov. 5, 1974

[21] Appl. No.: 521,031

[30] Foreign Application Priority Data
Oct. 23, 1973 France .............................. 73.37697

[52] U.S. Cl. ............... 360/113; 338/32 R; 360/122; 360/123; 360/125
[51] Int. Cl.² .... G11B 5/30; G11B 5/16; G11B 5/22
[58] Field of Search ............. 360/113, 66, 121, 125; 338/32 R; 324/46; 340/174 EB

[56] References Cited
UNITED STATES PATENTS

| | | | |
|---|---|---|---|
| 3,493,694 | 2/1970 | Hunt .................................... | 360/113 |
| 3,731,007 | 5/1973 | Masuda et al. ...................... | 360/113 |
| 3,840,898 | 10/1974 | Bajorek et al. ...................... | 360/113 |
| 3,860,965 | 1/1975 | Voegeli ................................ | 360/113 |
| 3,881,190 | 4/1975 | Brock et al. ......................... | 360/113 |

Primary Examiner—Alfred H. Eddleman
Attorney, Agent, or Firm—Kemon, Palmer & Estabrook

[57] ABSTRACT

An electromagnetic transducer based on the magnetoresistive effect is made of a stack of members each of which comprises a magnetoresistive layer enclosed, with interposition of non-magnetic insulating layer, between two thicker high permeability layers, so that these layers are in leakage field magnetostatic coupling. The members are stacked with interposition of non-magnetic layers such that they are in relative edge effect magnetostatic coupling relation. Each magnetoresistive layer has its easy magnetization axis 45° to the direction of passage of an electrical current therethrough and said axes are 90° to each other in any two of the consecutive members of the stack.

7 Claims, 1 Drawing Figure

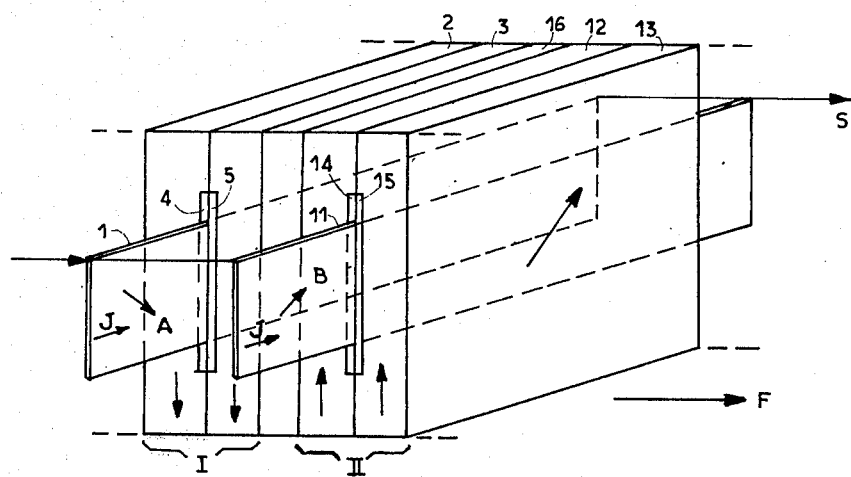

ELECTROMAGNETIC TRANSDUCERS

THE PRIOR ART

The present invention concerns improvements in or relating to electromagnetic transducers which, for the detection or sensing magnetic transitions on a magnetic carrier in close proximity on one edge of the transducer, is based on the magnetoresistive property of thin layer magnetic materials. Such materials are responsive to an application of an external magnetic field by a variation of electrical resistance which may be sensed by the passage of an electrical current applied under constant voltage to the magnetoresistive member of the transducer. An illustrative disclosure of such magnetoresistive materials, mainly comprising iron-nickel ferromagnetic alloys, in anisotropic condition thereof, may for instance be found in an article by M. C. Van ELST in "PHYSICA", vol. XXV, 1959, pp.702–720, entitled "The anisotropy in the magnetoresistance of some nickel alloys".

The electromagnetic transducers based on such magnetoresistive materials are fundamentally responsive to the absolute value of the external magnetic flux and not merely to the variations of said flux. They consequently enable a read-out from a magnetic digital record at any speed of travel, including zero. They have a frequency response from zero to some tens of megahertz. They issue a read-out signal which may be definitely higher than that of conventional transducers which can respond only to magnetic flux changes.

Such magnetoresistive transducers present two drawbacks. Firstly, they are not responsive to the direction of the external magnetic flux. This first drawback can be avoided by establishing the easy axis of magnetization of the layer 45° to the direction of passage of the electrical current through it. One may refer, for instance, in this respect to U.S. Pat. No. 3,848,217 in the name of the same inventor as the present application. Secondly, the resolution factor of the magnetoresistive transducers is low so that it does not enable separation of localized sources of magnetic flux in close proximity, as is the case for successive magnetic transitions in high density digital records, wherein, for instance, the storage locations are each under 3 microns width, and the spacings between them do not reach more than about 15 microns. This second drawback mainly results from the fact that the rotation of the magnetization vector is not coherent along the height of the layer from the edge which is the nearer to the external source of magnetic field, whereas it is the amplitude of this rotation which measures the value of said external field, up to the saturation of the material of the layer according to its difficult axis of magnetization. The saturation of the layer occurs when the value of the external field reaches the value of the field of anisotropy $H_K$ of the material of the layer. The value of $H_K$ is about 3 oersteds for a layer the thickness of which is from 200 to 300 A and which is made in a nickel-iron alloy such as permalloy. Such a layer presents a magnetoresistive response. This second drawback is actually reduced when, according to above patent, the magnetoresistive layer is placed between two thicker high permeability magnetic layers, from about 1000 A to more than 5 microns. Said thicker layers, made of an anisotropic material, are magnetostatically coupled with the magnetoresistive layer through insulating films, illustratively silica films a few hundreds Angstroms thick. Said thicker layers guide the lines of force of the external magnetic field and the value of the flux reaches a maximum when the transverse axis of the thus created window coincides with the perpendicular plane wherein the source of the external field is located.

With such a structure, one may use magnetoresistive layers of appreciably high demagnetizing fields because such fields are short-circuited by the thicker layers. When no external field is applied, the magnetization vectors of the thicker layers align on the direction of the easy axis of magnetization of the magnetoresistive layer though the orientation of the vector in one of the thicker layers is reverse with respect to the orientation of said vector in the other one. When an external field is applied to the member, the magnetization vectors of the thicker layers rotate and the value of their angle of rotation may be adjusted to 45° by adjusting their thickness. Due to the magnetostatic coupling, the rotation of the magnetization vectors of the thicker layers drives the magnetization vector of the magnetoresistive layer into a corresponding coherent rotation.

In U.S. Pat. No. 3,879,760 by the same Applicant, another thin film magnetoresistive transducer is described which comprises a pair of parallel magnetostatically coupled magnetoresistive layers with crossed axes of easy magnetization each of which substantially is 45° to the direction of passage of an electrical current and 45° to the direction of the external magnetic field. The layers are jointly fed under constant voltage and are differentially interconnected for summation of their response electrical signals. The read-out signal has a value proportional to that of the external field seen through a window of a breadth equal the distance across the planes of the layers. The layers may be made of a magnetostrictive free nickel-iron alloy of about 600 A thickness, and they may be spaced apart by a silica layer about 0.8 micron thick. Each layer may be about 60 microns high. This structure may read a magnetic track about 1 millimeter wide.

SHORT SUMMARY OF THE INVENTION

The object of the invention is to provide a new and improved structure of a magnetoresistive electromagnetic transducer having an increased localization power for an external magnetic field source and, essentially, a much wider frequency response than the structures of the prior art, with an undiminished efficiency:- the narrower the window, the higher the frequency response, the lesser is the efficiency and consequently the lower is the level of the output signal, and a structure according to the present invention obviates such drawback.

For obtaining such high efficiency, high localization power and wide frequency response, recourse is made in the invention to two distinct magnetostatic couplings between thin magnetic layers. A leakage field coupling between a magnetoresistive layer and a high permeability thicker layer, is achieved by enclosing a magnetoresistive member within two high permeability thicker layers. Secondly, an edge effect coupling has been found to exist between adjacent thicker layers in a stack of such magnetoresistive members. In each member the easy axis of magnetization of the magnetoresistive layer is 45° to th flow direction of the read-out electrical current and, from member to member in the stack, the easy axes of magnetization are crossed at 90° in regular alternation.

BRIEF DESCRIPTION OF THE DRAWING

The single FIGURE of the drawings shows in partial perspective view, one embodiment wherein, for the sake of clarity the layers are shown in planar shapes and without true scale ratios in the relative dimensions thereof. Actually, as the layers will be successively forced on a substrate, through evaporation process for instance, it must be understood that the layers will progressively warp. The insulating layers are formed for also insulating the edges of the magnetic layers with the exception of the ends of the magnetoresistive layers on which are provided the electrical connections for placing said layers in a series or a parallel electrical circuit as the case may be.

DETAILED DESCRIPTION

The structure is shown illustratively restricted to two stacked members, I and II. Any number of such members may be provided as required. The member I comprises a magnetoresistive layer 1 sandwiched between two thicker layers 2 and 3 of a high permeability material. Non-magnetic insulating layers 4 and 5 ensure a field leakage magnetostatic coupling of the magnetoresistive layer with the high permeability thicker layers. The member II is identically formed, a magnetoresistive layer 11 sandwiched between two high permeability thicker layers 12 and 13 and coupled thereto by non-magnetic insulating layers 14 and 15. Between the layers 3 and 12 is a non-magnetic layer 16 which ensures an edge effect magnetostatic coupling between the said magnetic layers 3 and 12.

The magnetoresistive layers may be made of permalloy or the like. Each of them may have a thickness of about 300 A. Their axes of easy magnetization are respectively shown at A for the magnetoresistive layer 1 and at B for the magnetoresistive layer 11. They are crossed at 90° and each of which is slanted at 45° to the direction of flow of an electrical current J and also at 45° to their lower edge which, when the transducer is used as a magnetic record head, will be parallel to the record travelling along the direction of the arrow F in close proximity to said edge.

In the example shown in the drawing, the two magnetoresistive layers 1 and 11 are commonly fed with an electrical current J under constant voltage from an input not shown and the current passes in parallel through said layers and is outputted at S. In other cases, it may be preferred to provide a series connection of the layers across the input and the output S.

Each one of the layers 2,3 and 12,13 is made of a magnetic material which, at the thickness of such layers, presents a high permeability of the order of $10^{-3}$ or more when, at least, the magnetic material is used according to its difficult axis of magnetization. The thickness provided is about 10 times the thickness of the magnetoresistive layers, or more than this when needed.

Each of the layers 4,5 and 14,15 is made of a non-magnetic and insulating material as, for instance, silica. The thicknesses of these layers are such that they ensure a leakage field coupling between the magnetoresistive layer, 1 or 11, and the thicker magnetic layers, 2 and 3 for 1, 12 and 13 for 11. For such thicknesses as indicated above for the layers 1, 11 and 2,3 and 12,13 (which may be made of iron-nickel or iron-nickel-chromium for instance), a leakage field coupling is obtained with silica layers of the order of 1000 A thick.

Such a coupling relation aligns th easy magnetization axis of each thicker high permeability layer on the corresponding axis of the magnetoresistive layer. The leakage fields which are locally generated within the magnetoresistive layer from the dispersion of the spins of its magnetization influence the orientation of the spins of the enclosing thicker layers according to the biassing field. The latter is defined by the induced axis of the magnetoresistive layer so that, without any external field, the interaction energetic equilibrium is reached. In each member of the transducer, the two high permeability layers are in contact on both sides of the magnetoresistive layers, which is actually coated by the insulating non-magnetic material. The magnetization vectors of the two layers are parallel and of same amplitude. As the easy magnetization axes of the layers 1 and 11 are crossed, the magnetization vectors of the high permeability layers are also crossed from member to member of the transducer. Consequently, the vertical components of said vectors are of opposite directions from member to member as indicated by corresponding arrows in the drawing.

The transducer members I and II are in relative magnetostatic coupling based on the edge effect of their high permeability layers. To explain such an effect, each pair of layers 2–3 of member I and 12–13 of member II must be considered as an integral single magnetic layer having the thickness of the complete member. The coupling is ensured from an adjustment of the thickness of the intervening layer 16 which is non-magnetic and which may or not be conductive, though for the sake of simplicity, it may be made of the same material as the layers 4–5 and 14–15. This coupling favors anti-parallel orientations of the magnetizations in the coupled layers and is due to the demagnetizing fields which appear near the edges of the layers. The thickness of the intervening layer is made such that the difference between the values of the demagnetizing fields at most equals the value of the coercive field of each of them. A definition of the edge effect coupling and the computation of its thickness are for instance disclosed in an article of J. M. DAUGHTON & H. CHANG in "Journal of Applied Physics", vol.36, No.3, March 1965, page 1124. Referring to the herein above thickness values, the thickness of the coupling layer between the members I and II may be from about 1000 to about 3000 A.

The structure which is shown in the figure facilitates an understanding of the advantages of the invention. Each transducer member is considered as a high permeability homogeneous magnetic layer. The anisotropic field of each such homogeneous layer has a low value, of about 1 to 5 oersteds and the permeability along the difficult axis of magnetization is high, about $10^3$ to $10^4$ for the materials and the thicknesses hereinabove defined. The two "homogeneous" layers together define a read-out window the width of which equals twice their own thickness plus the thickness of the intervening coupling layer. The structure suitably guides the lines of the magnetic field generated by such an external source as a magnetic transition of a magnetic recording layer. The amplitude of the resulting rotation of the magnetization is proportional to the value of the said external field, except, perhaps, near the edge of the layers opposite to the airgap edge, which is not important since the magnetoresistive layers do not reach said opposite edge.

The width of the window (which is the full equivalent of the breadth of the airgap in a conventional magnetic transducer head) must be, in order to avoid a magnetic saturation which will render the read-out erroneous, higher than a value which may be defined as follows. Assuming assuming that the magnetic recording layer, which is thicker than the layers of the transducer, say 2 microns, presents a remanent induction of the order of 1000 Gauss, it generates a leakage flux approximately one-third of the product of the remanent induction and the thickness. The magnetic flux which the read-out window can accept is the product of the remanent induction of the magnetic material and the width of the window (which constitutes a magnetic discontinuity between the substrate and an insulating protective layer on the other side of the stack). The value of the remanent induction of the structure described is about 10,000 gauss. It is apparent that the window would necessitate a width of about 0.06 micron to be saturated, which is much lower than the width of a magnetic transition in any high density record which is presently possible on a tape, a disc or a drum. A window of a transducer structure according to the present invention can be made as narrow as is necessary for avoiding saturation of its material. The frequency response of such a transducer will consequently be broader than that of the prior art structures and the localization capability can be ensured with as high precision as required.

What is claimed is:

1. Electromagnetic transducer member comprising the combination of:
   a magnetoresistive layer having its easy magnetization axis 45° to the direction of passage of an electrical current and having an edge 90° to said direction,
   a pair of high permeability thicker magnetic layers enclosing the said magnetoresistive layer and contacting each other on both sides of the height of the magnetoresistive layer 90° to said edge, and,
   means coupling each of said thicker layers to said magnetoresistive layer in leakage field magnetostatic coupling relation.

2. Electromagnetic transducer device comprising the combination of:
   a plurality of members each comprising a magnetoresistive layer having its easy magnetization axis 45° to the direction of passage of an electrical current and having an edge 90° to said direction and a pair of high permeability thicker magnetic layers each of which is in leakage field magnetostatic coupling relation to said magnetoresistive layer and contacting each other on both sides of the height of the magnetoresistive layer 90° to said edge,
   said members being stacked with the easy magnetization axes of alternate magnetoresistive layers in the members 90° to the other easy magnetization axes of the other magnetoresistive members,
   means coupling the adjacent high permeability layers in the stack in edge effect magnetostatic coupling relation, and,
   means feeding the magnetoresistive layers of the stack with a single electrical current.

3. Electromagnetic transducer device according to claim 2, wherein the thickness of each of the high permeability layers is at least ten times the thickness of each of the magnetoresistive layers.

4. Electromagnetic transducer device according to claim 2, wherein the leakage field magnetostatic coupling in each member is achieved by means of a non-magnetic insulating coating on the magnetoresistive layer thereof.

5. The electromagnetic transducer device according to claim 2 including a non-magnetic layer interposed between adjacent members to effect edge magnetostatic coupling between adjacent members.

6. An electromagnetic transducer member comprising in combination:
   a. a magnetoresistive layer having its easy magnetization axis 45° to the direction of passage of an electrical current therethrough and having an edge which is 90° to said direction;
   b. a high permeability magnetic layer thicker than said magnetoresistive layer; and
   c. means mutually coupling said two layers in flux leakage magnetostatic relation.

7. An electromagnetic transducer member according to claim 6, wherein said high permeability magnetic thicker layer surrounds said magnetoresistive layer except side edges thereof 90° to said direction.

* * * * *